United States Patent [19]
Anderson et al.

[11] Patent Number: 5,555,718
[45] Date of Patent: Sep. 17, 1996

[54] METHOD AND APPARATUS FOR INJECTING REACTANT FOR CATALYTIC REDUCTION IN A GAS TURBINE COMBINED CYCLE SYSTEM

[75] Inventors: David K. Anderson, East Longmeadow, Mass.; Mark R. Malo, Middletown, Conn.

[73] Assignee: Combustion Engineering, Inc., Windsor, Conn.

[21] Appl. No.: 337,994

[22] Filed: Nov. 10, 1994

[51] Int. Cl.$^6$ .................................................. F02C 6/18
[52] U.S. Cl. .................................... 60/39.02; 60/39.182
[58] Field of Search .................... 60/39.02, 39.182; 122/7 R, 7 B

[56] References Cited

U.S. PATENT DOCUMENTS

| 4,160,805 | 7/1979 | Inaba et al. | 60/39.182 |
| 4,875,436 | 10/1989 | Smith et al. | 60/39.182 |

FOREIGN PATENT DOCUMENTS

| 133486 | 8/1983 | Japan | 60/39.182 |

OTHER PUBLICATIONS

"Combustion Fossil Power, A Reference Book on Fuel Burning and Steam Generation" Editor—Joseph G. Singer, P. E., 4th Edition, 1991, pp. 1–16 to 1–18; 8–30 to 8–34; and 15–64 to 15–66.

Primary Examiner—Louis J. Casaregola
Attorney, Agent, or Firm—Chilton, Alix & Van Kirk

[57] ABSTRACT

A combined cycle system has a gas turbine connected to a heat recovery steam generator and the heat recovery steam generator contains a selective catalytic reactor section wherein nitrogen oxides ($NO_x$) are reacted with reactant gas such as ammonia or urea to produce molecular nitrogen and water vapor. The expanding transition section contains an array of flow profile control pipes extending across the section in a pattern which distribute the flue gas uniformly over the large cross-section of the heat transfer section. The reactant gas is injected into the flue gas stream through a series of nozzles spaced across the flow control pipes so as to uniformly mix and distribute the reactant gas in the flue gas stream before it enters the selective catalytic reactor section.

2 Claims, 4 Drawing Sheets

METHOD AND APPARATUS FOR INJECTING REACTANT FOR CATALYTIC REDUCTION IN A GAS TURBINE COMBINED CYCLE SYSTEM

The present invention relates to a gas turbine combined cycle system with a heat recovery steam generator and a selective catalytic reactor to reduce nitrogen oxides ($NO_x$) and particularly to an improved method and system for injecting the reducing reactant gas ($NH_3$ or urea) into the exhaust gas stream.

BACKGROUND OF THE INVENTION

Gas turbines have been widely used to provide power for electric utilities usually for standby or peaking power. Because the thermal efficiency of the gas turbine by itself is rather low due to the high exit gas temperature, the gas turbine is often combined with a heat recovery steam generator and a steam turbine to produce additional electricity. As a combination of a gas turbine cycle and a steam turbine cycle, these systems are referred to as "combined cycles".

All fossil-fuel-fired combustion processes have the potential for producing nitrogen oxides ($NO_x$) including primarily NO with some $NO_2$. This also applies to the combustion process in a gas turbine where there are high temperatures and high excess air levels. Therefore, the exit gas from the gas turbine which flows into and through the heat recovery steam generator contains a significant quantity of $NO_x$. The current global emphasis on environmental protection and pollution abatement has fostered the development of techniques for reducing the emissions of the oxides of nitrogen because they participate in complex chemical reactions that lead to the formation of photo-chemical smog in the atmosphere. One such technique is known as selective catalytic reduction which uses a catalyst and a reactant, such as urea or $NH_3$ gas, to disassociate $NO_x$ to molecular nitrogen gas and water vapor. Since $NO_x$ is in excess of 90 percent NO, the dominate reaction using ammonia is:

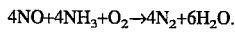

In addition to being used with conventional fossil-fuel-fired steam generators, these selective catalytic reactors have also been used with combined cycle systems with the selective catalytic reactor actually comprising a section within the heat recovery steam generator. For the effective operation of the selective catalytic reactor, it is important that the reactant be thoroughly mixed with the flue gas on a localized basis over the entire cross-section of the inlet to the selective catalytic reactor. This requires a large number of injection nozzles with their associated piping and usually a mixing grid at the inlet to the selective catalytic reactor section in order to assure uniform reactant dispersion. Of course, this all adds cost to the system.

SUMMARY OF THE INVENTION

An object of the present invention is to provide an improved and simplified method and system for introducing $NH_3$ or urea (or other reactant gas) into the flue gas stream in a combined cycle system to improve the mixing of the reactant with the flue gas. More particularly, the invention relates to the introduction of the reactant into the inlet transition section of heat recovery steam generator through an array of flow profile control pipes.

DESCRIPTION OF THE PREFERRED EMBODIMENT

Figure 1:
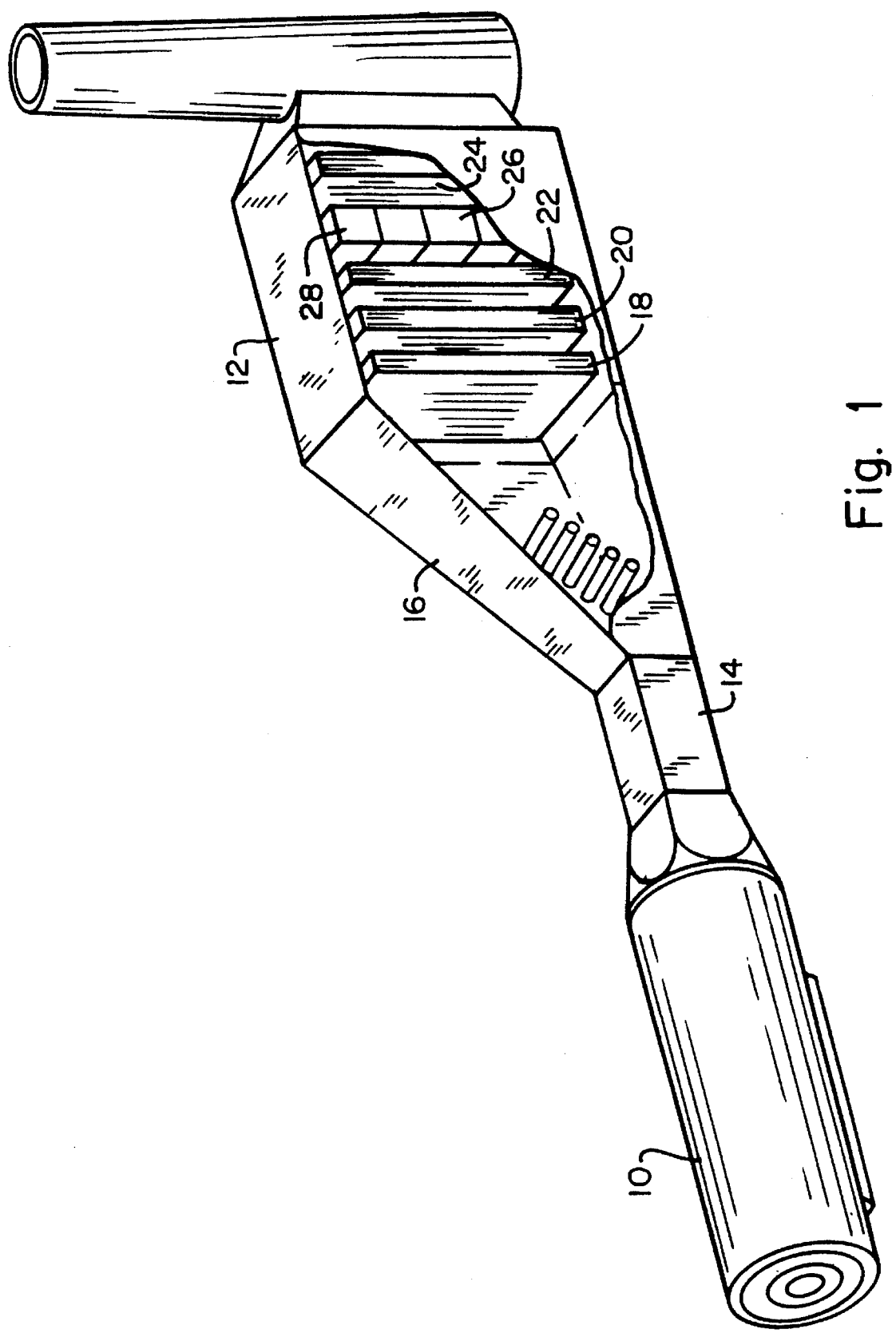
FIG. 1 is a perspective view of a gas turbine and a horizontal-gas-flow heat recovery steam generator system incorporating a selective catalytic reactor catalytic section.

FIG. 1 is a perspective view of a typical gas turbine 10 with the exhaust discharging into heat recovery steam generator generally designated 12. With the exit gas temperature from the gas turbine being in the range of 425° to 540° C. (about 800° to 1000° F.), there is considerable heat to be recovered in the steam generator to generate steam which normally drives an electric generator via a steam turbine.

The heat recovery steam generator 12 comprises an expanding inlet transition duct 16 where the gas flow is expanded from the duct 14 to the full cross-section of the portion of the steam generator containing the heat transfer surface. The heat transfer surface comprises the various tube banks 18, 20, 22 and 24, which, by way of example only, may be various combinations of superheater surface, evaporative surface, economizer surface and feedwater preheating surface. Any desired combination of such heat exchange surface is compatible with the present invention.

Located in the heat recovery steam generator is the selective catalytic reactor section 26 as has been done in the past. The catalyst may be any conventional catalyst used for the selective catalytic reduction of $NO_x$ and it can be in any conventional form. This section is preferably formed from catalyst modules 28 which are stacked in the cavity between tube banks 22 and 24 in a location where the gas is at a proper temperature for the catalytic reaction. This temperature is usually within the range of 300° to 400° C. (575° to 750° F.). The catalyst modules can be easily loaded into and removed from the steam generator.

Figure 2:
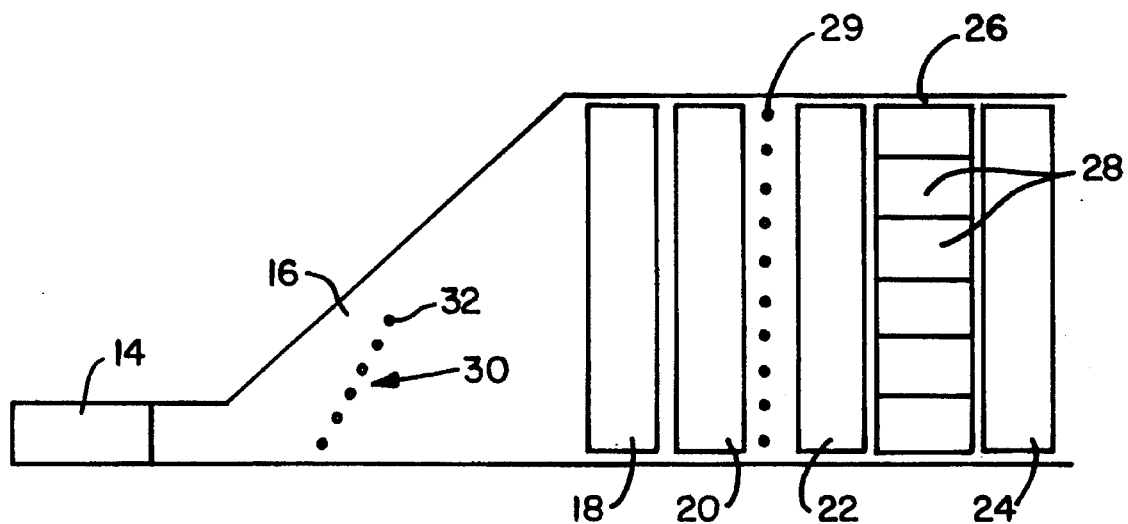
FIG. 2 is a diagrammatic representation of the cross-section of a conventional system for injecting reactant into a heat recovery steam generator.

FIG. 2 illustrates the arrangement of a typical prior art horizontal flow heat recovery steam generator including a selective catalytic reactor section 26. In the typical prior art systems, the ammonia or urea is injected through the injection header system 29 which is a series of relatively closely spaced tubes extending over the entire cross-section of the steam generator. These tubes have closely spaced nozzles for spraying the reactant in a relatively uniform pattern over the cross-section. To ensure optimum performance of the selective catalytic reactor, the flue gas and reactant flow profiles entering the catalyst should be within ±15% of the average. It is for that reason that an extensive array of injection nozzles has been used most generally in combination with a mixing grid or other turbulence creating device.

Figure 3:
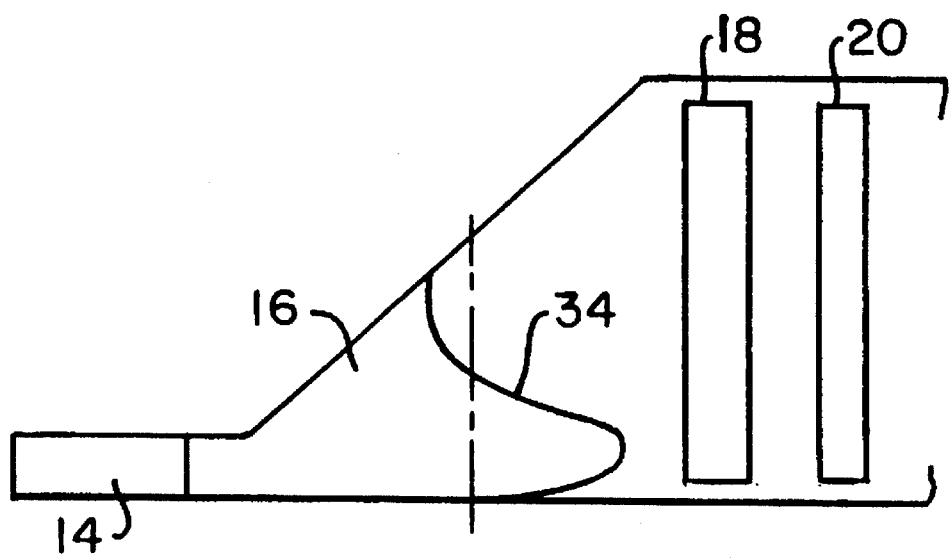
FIG. 3 is a diagram illustrating the gas flow profile within a system without any flow distribution means.
Figure 4:
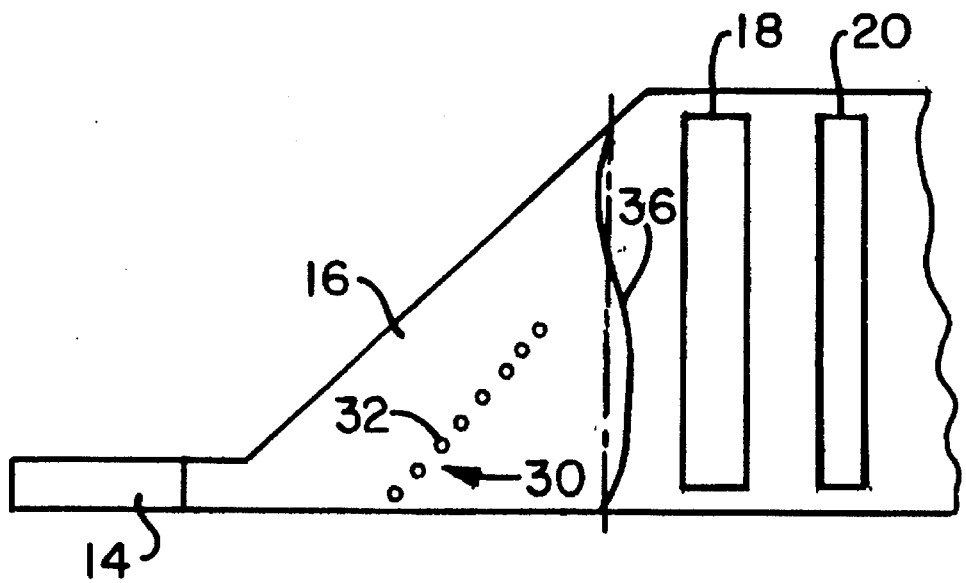
FIG. 4 is a diagram illustrating the gas flow profile after the installation of a flow control pipe array.

FIGS. 1 and 2 also show the use of a flow control pipe array 30 located in the inlet transition duct 16. The purpose of this flow control pipe array 30, composed of the individual pipes 32, is to distribute the exhaust gas flow uniformly across the heat transfer surfaces. This is shown in FIGS. 3 and 4 with FIG. 3 showing the flow profile 34 without the flow control pipe array and FIG. 4 showing the flow profile 36 with the array installed. These flow control pipes are typically constructed of a series of 7.6 to 10.2 cm (3 to 4 inch) diameter pipes running horizontally across the transition duct 16. The array for the specific arrangement of gas turbine and steam generator shown is normally sloped as shown in these FIGS. 1, 2 and 4 but the optimum arrangement as to the spacing of pipes and slope or the array will depend upon, and be adapted to, the particular flow characteristics of any specific combination of gas turbine and steam generator as determined by flow modeling. As can be seen in these FIGS. 3 and 4, the flow control pipe array has a dramatic effect on the flow pattern and tends to create a uniform flow throughout the cross-section of the steam generator.

Figure 5:
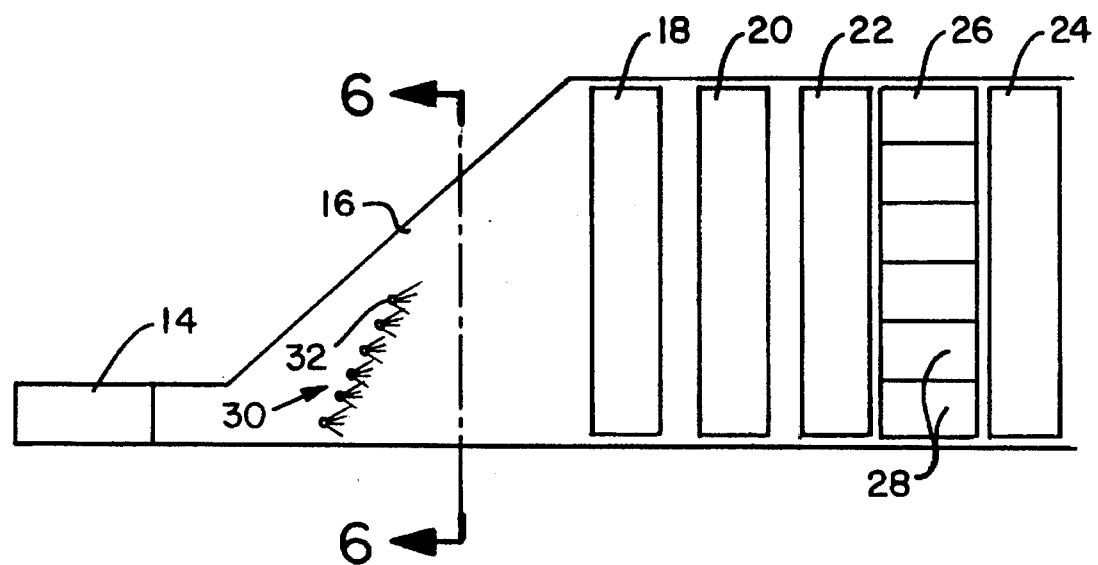
FIG. 5 is a diagrammatic representation of the cross-section of a heat recovery steam generator system incorporating the present invention.
Figure 6:
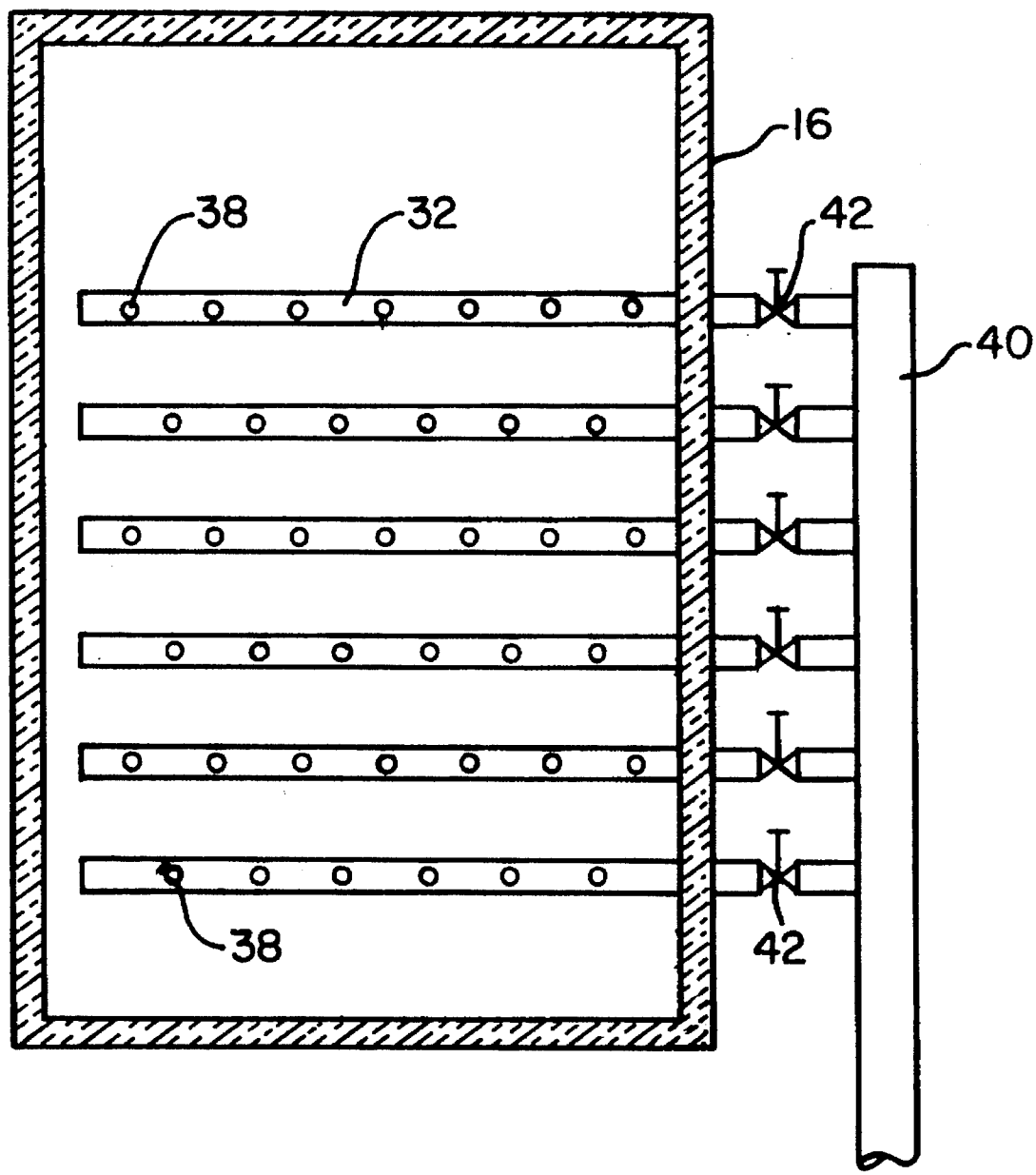
FIG. 6 is a detailed view of a flow control pipe array incorporating the injector nozzles and is a section taken along line 6—6 of FIG. 5.

The present invention is most clearly illustrated in FIG. 5 and involves the relocation of the injection position from that shown in FIG. 2 to the flow control pipe array 30. Located along each pipe 32 are a series of injection nozzles 38 which are typically, but not limited to, 30.5 cm (12 inches) apart. The exact spacing will depend upon the nozzle spray pattern and may be selected to obtain an optimum degree of mixing with a minimum number of nozzles. As shown in FIG. 6, the flow control array pipes 32 are connected to a supply manifold 40 and valve means 42 may be provided to control the flow to each pipe to balance the $NH_3$ or urea distribution.

Because the flow control pipe array is located where the pipes come into contact with the majority of the turbine exhaust mass flow, the array is the ideal location for the reactant injection. Because an even distribution of reactant is achieved at the point of injection, an even distribution will be achieved at the inlet to the catalyst section. The use of the array for both flow control and reactant injection has multiple benefits. It eliminates the cost of the conventional large injection array 29 shown in FIG. 2 and also the pressure drop of the old normal array is eliminated.

We claim:

1. A method of operating a gas turbine combined cycle system wherein said gas turbine combined cycle system comprises a gas turbine to generate power, a heat recover steam generator including an inlet section for flue gas from said gas turbine having a selected gas flow area, a heat transfer section containing heat transfer surface and a selective catalytic reactor section having a gas flow area larger than said selected gas flow area and an expanding transition section connecting said inlet section to said heat transfer section and wherein said expanding transition section includes a plurality of flow profile control pipes extending across said expanding transition section and arranged in a selected pattern adapted to redistribute the flue gas flow within said expanding transition section such that said flue gas flow is relatively uniformly distributed throughout the gas flow area of said heat transfer section, said method comprising the steps of:

a. burning a fuel with air whereby flue gas is formed containing $NO_x$ and excess oxygen and passing said flue gas through a gas turbine and into said inlet section;

b. passing said flue gas through said expanding transition section over said plurality of flow profile control pipes and into said heat transfer section and into contact with said selective catalytic reactor section; and c. injecting a reactant gas for reaction with $NO_x$ in said selective catalytic reactor section into said flue gas in said expanding transition section through nozzles located across each of said flow profile control pipes whereby said reactant gas is uniformly distributed in said flue gas.

2. A method as recited in claim 3, wherein said reactant gas is selected from the group consisting of ammonia and urea.

* * * * *